United States Patent Office 3,577,402
Patented May 4, 1971

---

3,577,402
PASTE ROSIN SIZE CONTAINING VISCOSITY DEPRESSANT
Robert Alan Dorbransky, Stamford, Conn., assignor to American Cyanamid Company, Stamford, Conn.
No Drawing. Filed July 24, 1968, Ser. No. 747,132
Int. Cl. C08h *11/00*
U.S. Cl. 260—97        2 Claims

ABSTRACT OF THE DISCLOSURE

Paste rosin size at 150°–200° F. containing 0.5%–5% of a water-soluble alkanepolyol which has a molecular weight below 250 and a boiling point above 150° C. possesses low viscosity and decreased tendency to develop a hard, brittle, foamy crust when exposed to the air in that temperature range.

---

The invention relates to paste rosin size of decreased viscosity and of decreased tendency to form a hard, brittle, foamy crust when exposed to the air at normal elevated temperature.

Paste rosin size at normal temperature is a viscous aqueous solution containing 60%–80% by weight of papermakers rosin which has been saponified to the extent of 75% or more, and is in wide use as a sizing agent in the manufacture of paper; cf. Di Placido U.S. Pat. No. 3,390,004.

In general, the higher its content of rosin size the higher is its viscosity. To minimize the cost of shipping water, paste rosin size is generally shipped at the minimum water content at which it is pumpable.

The viscosity of paste rosin size decreases (and its pumpability improves) with rising temperatures, and hence most paste rosin size today is shipped and stored at maximum practical temperature, in the range of 150° F.–200° F. and generally close to 200° F.

A serious problem exists with such size, in that the surface of the size changes when exposed to air at normal shipping or storage temperature. The surface paste rosin size loses water rapidly by evaporation and changes to a hard, brittle foamy crust. This crust does not readily re-dissolve in the size and is troublesome to remove. If not removed but is crushed, the resulting particles tend to clog pumps and screens and to appear as specks in the finished paper. Such specks are highly undesirable.

The discovery has now been made that paste rosin size which has a small dissolved content of certain polyols has a substantially lower viscosity than comparable size which contains no polyol and that such size does not form a hard, brittle, foamy crust when exposed to air for long periods of time in its normal shipping and storage temperature range. In preferred embodiments the viscosity of the size is decreased more than 50% by the presence of less than 5% of the polyol, and the size does not form such crust when exposed to the air for as long as 24 hours at temperatures as high as 200° F.

The paste rosin sizes referred to above may be paste gum rosin size, paste wood rosin size, and paste tall oil rosin size; and the paste rosin sizes made by saponification of rosins which have been reacted with minor amounts of fortifying or anti-crystallizing agents, for example, maleic anhydride, fumaric acid, acetylenedicarboxylic acid, dehydrated citric acid, saliginin, formaldehyde, etc.

The polyols which are present in the size of the present invention are the water-soluble alkanepolyols which have a boiling point above 150° C. and a molecular weight less than 250. Best results so far have been achieved with water-soluble alkanediols having molecular weights less than 125.

Amongst the alkenepolyols suitable for use in the present invention are mannitol, sorbitol, pentaerythritol, glycerol, neopentyl glycol, 2,3-hexylene glycol, 1,3-butylene glycol, 1,2-propylene glycol and ethylene glycol. The boiling points of the agents are substantially above 150° C., so that they are substantially non-volatile even at the normal shipping temperature of paste rosin size, and their molecular weights are below 250.

A significant decrease in the viscosity of paste rosin size is caused by the presence of ½%, based on the weight of rosin size solids, of the alkanepolyol in the size, and this amount is accordingly deemed the minimum practical amount of polyol that is economically present.

On the other hand, the decrease in viscosity afforded by the presence of more than 5% of the polyol (calculated on the same basis) is slight. Roughly ⅔ of the decrease in viscosity which is effected by a massive amount (20%) of the polyol is effected by only 5% of the polyol, so that this latter amount (which is more than that required to solve the problem of crust formation in preferred instances) is deemed the practical maximum for the amount of polyol which need be present. The most effective part of the range, per unit weight of polyol present and practicality of results, is the range between 2% and 4% which is therefore preferred.

The sizes of the present invention can be manufactured by introducing the desired polyol (or mixture of polyols) into the aqueous alkali metal alkali solution which is used to saponify the rosin, or by introducing the polyol into the finished size. In the continuous automatic manufacture of paste rosin size such as is shown in the Di Placido patent, the polyol can be continuously metered into the stream of alkali metal alkali as it enters the emulsifier. It is thus uniformly and automatically incorporated into the size.

The resulting sizes are stable on storage for extended periods of time at 180° C. in closed containers. The presence of polyol within the specified range, does not decrease or increase significantly the capacity of the size to impart water-resistance to paper.

The invention will be further illustrated by the examples which follow. These examples illustrate preferred embodiments of the invention and are not to be construed as limitations thereon.

EXAMPLE 1

A sample of commercial paste rosin size having a viscosity of 2900 centipoises at 71° C., a solids content of 76% by weight, a free rosin acid content of 11% (equivalent to 89% saponification) and 1% sodium chloride based on the weight of solids therein, is heated to 160° F. The size is prepared by saponification of a mixture of fumarated rosin and formaldehyde reacted rosin with sodium hydroxide, by the procedure of Example 3 of D'Errico et al. application Ser. No. 536,538, now U.S. Patent No. 3,400,117.

A sample is withdrawn and into it is stirred 2.66% based on the weight thereof, of a 76% by weight aqueous solution of one of the polyols shown in the table below, after which the viscosity of the resulting size (containing 3.5% by weight of polyol based on the weight of rosin solids therein) is determined at 71° C.

The sample is tested for its tendency to form a hard, brittle, foamy crust by half-filling a test tube with the size, and placing the test tube (without a stopper) for 24 hours in a constant temperature bath at 100° C. Failure of such crust to form in 6 hours indicates that the size is satisfactory in this respect. The procedure is repeated with the other polyols shown in the table, and with an untreated sample as control. Results are as follows:

| | Polyol present | | Viscosity of size [2] | | Agount of foamy crust [3] |
|---|---|---|---|---|---|
| Name | Mol weight | Percent [1] | Centipoises | Percent decrease | |
| Run No.: | | | | | |
| 1 ... None (control) | | | 2,900 | | Severe [4]. |
| 2 ... Mannitol | 182 | 3.5 | 2,740 | 4.1 | None. |
| 3 ... Pentaerythritol | 136 | 3.5 | 2,600 | 10.6 | Do. |
| 4 ... Glycerol | 92 | 3.5 | 2,300 | 20.6 | Do. |
| 5 ... Neopentyl glycol | 104 | 3.5 | 1,800 | 37.9 | Do. |
| 6 ... Ethylene glycol | 62 | 3.5 | 1,650 | 43.0 | Do. |
| 7 ... 1,3-butylene glycol | 90 | 3.5 | 1,575 | 45.6 | Do. |
| 8 ... 1,2-propylene glycol | 76 | 3.5 | 1,540 | 46.9 | Do. |
| 9 ... 2,3-hexylene glycol | 118 | 3.5 | 1,440 | 50.5 | Do. |

[1] Percent present, based on weight of total solids in size.
[2] At 71° C., after addition of polyol.
[3] After 24 hours in open half-filled test tube at 100° C.
[4] Crust resembles a dry honeycomb about ¼" thick.

EXAMPLE 2

The following illustrates the effect of variations in the amount of a preferred polyol as viscosity depressant.

The procedure of run 8 of Example 1 is repeated a number of times, the amount of the propylene glycol being varied as is shown in the table below.

| | Viscosity of size [2] | |
|---|---|---|
| Percent [1] | Found centipoises | Percent Decrease |
| None | 2,900 | |
| 0.5 | 2,540 | 12.4 |
| 1.0 | 2,200 | 24.2 |
| 1.5 | 2,000 | 31.0 |
| 2.0 | 1,800 | 38.0 |
| 3.5 | 1,540 | 46.8 |
| 4.0 | 1,500 | 48.3 |
| 5.0 | 1,450 | 50.0 |
| 10.0 | 890 | 69.2 |
| 20.0 | 654 | 77.8 |

[1] $CH_2OHCHOHCH_3$ present based on the total weight of solids in size.
[2] At 71° C.

The data show that 5% of the propylene glycol accomplishes about ¾ of the reduction in viscosity which is accomplished by 10% of the glycol and about ⅔ of the reduction in viscosity which is accomplished by 20% of the glycol.

EXAMPLE 3

The following illustrates the response of several paste rosin sizes to the viscosity depressing effect of polyols. The solids content of the sizes is in the range 70%–78%. They contain 10%–15% free rosin acids (i.e., the rosin content thereof is 90%–85% saponified) and the viscosities are determined at 71° C.

| Paste rosin size | | Polyol present | | Viscosity of size | |
|---|---|---|---|---|---|
| Name | Viscosity centipoises | Name | Percent [1] | Centipoises [2] | Percent decrease |
| Number: | | | | | |
| 1 ... Heat treated gum rosin [3] | 2,500 | Propylene glycol | 1.65 | 1,600 | 36.0 |
| 2 ... Disproportionated tall oil rosin [4] | 12,340 | do | 3.5 | 6,340 | 48.5 |
| 3 ... Fumarated wood rosin [5] | 1,000 | do | 3.5 | 500 | 50.0 |

[1] Based on total solids in size.
[2] After addition of the polyol.
[3] Prepared by saponifying gum rosin with NaOH to 77% solids and 10% free acid.
[4] Prepared by heating tall oil rosin to 225° C.–300° C with a disproportionation catalyst for 30 minutes and then saponifying to 78% solids and 10% free acid content.
[5] Prepared by heating 1 mol of wood rosin with ½ mol of fumaric acid at 200° C. and then saponifying to 70% solids and 11% free acid content.

EXAMPLE 4

The size prepared by the procedure of run 8 of Example 1 is kept for 3 months in a closed container at 180° F. Its viscosity, its resistance to foamy crust formation when exposed to the air at 100° C. and its properties as sizing agent for paper do not change noticeably during the interval.

I claim:
1. Paste rosin size having an effective dissolved content in the range of 0.5%–5%, based on the weight of rosin size solids therein, of 2,3-propylene glycol as agent decreasing the viscosity of the size and the tendency of the size to form a hard, brittle foamy crust when exposed to air at 150° F.–200° F.

2. Paste rosin size according to claim 1 wherein the weight of 2,3-propylene glycol is 2%–4% of the weight of rosin size solids in said size.

References Cited

UNITED STATES PATENTS

| 2,573,024 | 10/1951 | Howell | 106—238 |
| 2,881,084 | 4/1959 | Watkins | 106—238 |
| 3,390,004 | 6/1968 | Di Placido | 106—238 |
| 3,433,659 | 3/1969 | D'Errico et al. | 106—238 |

FOREIGN PATENTS

| 601,467 | 7/1960 | Canada | 260—97 |
| 1,045,400 | 10/1966 | Great Britain | 260—97 |

DONALD E. CZAJA, Primary Examiner

W. E. PARKER, Assistant Examiner

U.S. Cl. X.R.

106—237; 162—168, 180

22,639

UNITED STATES PATENT OFFICE
CERTIFICATE OF CORRECTION

Patent No. 3,577,402　　　　　　　　Dated May 4, 1971

Inventor(s) Robert Alan Dobransky

It is certified that error appears in the above-identified patent and that said Letters Patent are hereby corrected as shown below:

Column 3, first table, last column heading, "Agount" should read -- Amount --; Column 3, second table, line 68, second column of table "654" should read -- 645 --.

Signed and sealed this 3rd day of August 1971.

(SEAL)
Attest:

EDWARD M. FLETCHER, JR.　　　　　　WILLIAM E. SCHUYLER, JR.
Attesting Officer　　　　　　　　　　Commissioner of Patents 22,639

UNITED STATES PATENT OFFICE
CERTIFICATE OF CORRECTION

Patent No. 3,577,402          Dated May 4, 1971

Inventor(s) ROBERT ALAN DOBRANSKY

It is certified that error appears in the above-identified patent and that said Letters Patent are hereby corrected as shown below:

Column 1 line 4 "Dorbransky" should read -- Dobransky --.

Signed and sealed this 18th day of January 1972.

(SEAL)
Attest:

EDWARD M. FLETCHER, JR.          ROBERT GOTTSCHALK
Attesting Officer                Acting Commissioner of Patents